ically the same
United States Patent Office 3,289,245
Patented Dec. 6, 1966

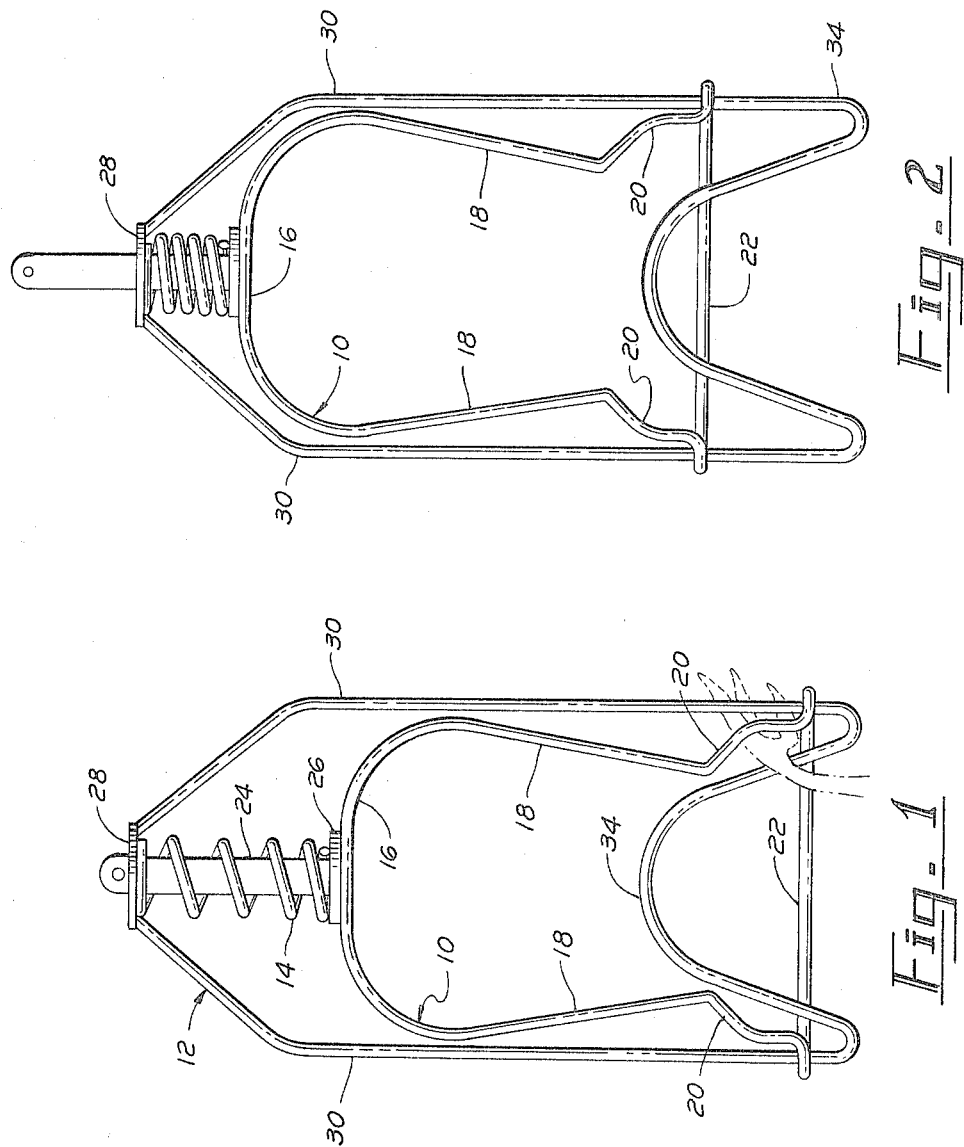
DELOS B. VAN DOLAH
EDWIN L. HULLAND
FRANKLIN E. BEST
INVENTORS.
BY E.T. McCabe
ATTORNEY.

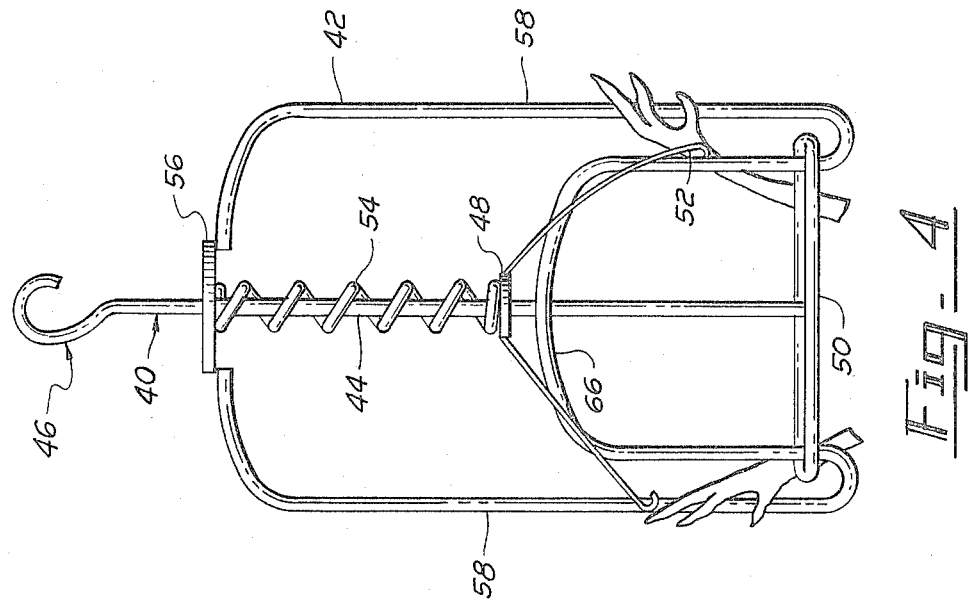
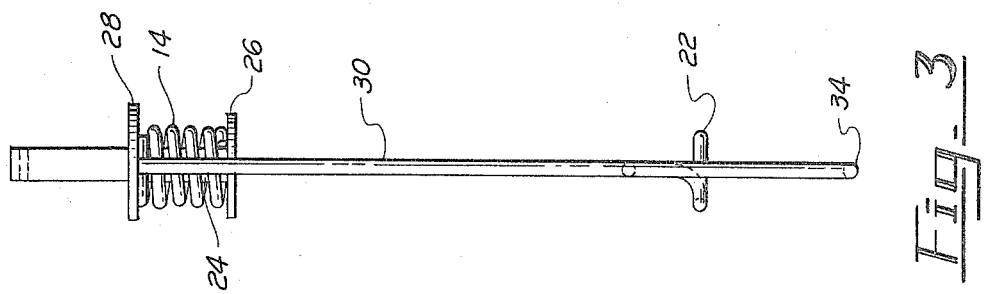

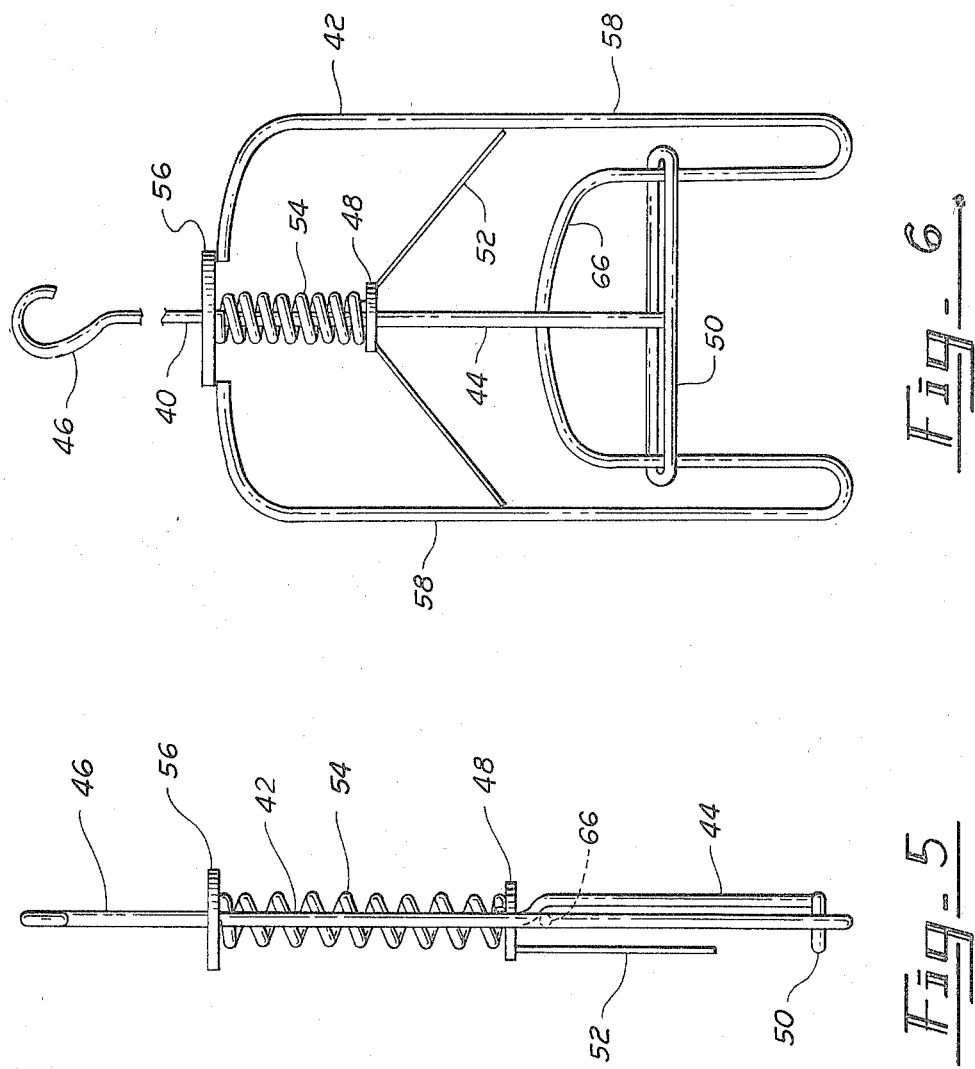

3,289,245
POULTRY SHACKLES
Delos B. Van Dolah, Chicago, and Edwin L. Hulland, Villa Park, Ill., and Franklin E. Best, Uniondale, N.Y., assignors to Swift & Company, Chicago, Ill., a corporation of Illinois
Filed Dec. 21, 1964, Ser. No. 419,911
4 Claims. (Cl. 17—44.1)

This invention relates to apparatus for suspending poultry and more particularly to poultry shackles.

In modern poultry plants it is customary to suspend poultry by shackles from a conveyor for movement past stations wherein the birds are bled, scalded, picked, singed, and chilled. Previously known poultry shackles have been designed for automatic mechanical discharge of a suspended bird, from the shackle, at the completion of processing.

Difficulty has been encountered in the use of the latter type automatic discharge shackles during scalding operations performed in a scald tank. Birds have had a tendency to float up and out of the leg holding slots of existing shackles, particularly when the liquid level of a scald tank is run higher than normal. It has not been possible to totally immerse the birds because of the tendency for the birds to float out of the shackle.

Another problem involved in the use of automatic discharge poultry shackles is the large amount of mtaintenance required. Poultry shackles are subjected to adverse conditions, including heat, moisture, and contaminations which tend to corrode and foul the parts, thereby rendering the shackle inoperative or unsatisfactory in operation. Constant maintenance has been required to keep the prior art devices operable in a satisfactory manner.

It is therefore an object of this invention to provide an automatic discharge poultry shackle adapted to prevent uncontrolled upward release of a bird from the shackle.

Another object of this invention is to provide an automatic poultry shackle wherein a bird is easily inserted and is prevented from floating out.

Another object of this invention is to provide an automatic poultry shackle which blocks accidental release of a bird and effectively releases the bird at a predetermined location.

A further object of the invention is to provide an automatic shackle of simple inexpensive construction which is durable and requires little maintenance.

In general, the present invention contemplates poultry shackles for supporting poultry during processing operations which comprise first and second frames. The first, or inner, frame is adapted to suspend the shackle and retain a bird's legs within slots formed in the second, or outer, frame. The second outer frame is reciprocable vertically relative to the first frame. Slot blocking means are carried on the first frame, either rigidly attached or integral therewith, to prevent accidental upward release of a bird from the shackle when the second frame is in a raised position. The first frame also includes ejector means to cause release of a bird's legs from the leg holding slots at a time when the second frame is lowered with respect to the first frame.

Further objects and advantages will become readily apparent to one skilled in the art from the following description of the invention taken in conjunction with the drawings wherein:

FIGURE 1 is a front elevation of an embodiment of the shackle showing the elements in raised position;

FIGURE 2 is a front elevation of the embodiment of the shackle shown in FIGURE 1, the elements in lowered position;

FIGURE 3 is a side elevation of the shackle as shown in FIGURE 2;

FIGURE 4 is a front elevation of another embodiment of the shackle wherein the elements are in raised position;

FIGURE 5 is a side elevation of the shackle shown in FIGURE 4, and

FIGURE 6 is a front elevation of the shackle of FIGURE 4 moved to a lowered position to receive or release a fowl.

Referring to FIGURES 1 to 3, there is illustrated a poultry shackle having a first inner frame 10, a second outer frame 12 aligned for vertical movement relative to fram 10, and a yieldable member 14 mounted on frame 10 biasing the outer frame 12 to a raised position with respect to the first frame member 10.

The first frame 10 comprises a substantially rigid corrosion resistant rod shaped to form a closed figure having a top portion 16 bent at opposite ends to provide a pair of downwardly extending side portions 18, each of which terminate in outwardly extending shoulders 20 below which is depended an interconnecting horizontal bottom bar 22, the ends of which are looped outwardly and rearwardly with respect to shoulders 20. It will become clear that the shoulders 20 constitute blocking means to prevent uncontrolled release of fowl upwardly from leg retaining slots formed in the second frame 12, to be further described, and the bar 22 constitutes an ejector means to lift poultry legs with respect to the aforementioned slots in frame 12.

The shoulders 20 may be bent in a variety of configurations for blocking slots of various shapes. It is only necessary that the shoulders extend in a generally horizontal direction, either horizontally or obliquely from the horizontal, in a manner to similarly block upward movement of the legs as will hereinafter be described.

Frame 10 may be formed of a continuous section of metal rod, welded or otherwise secured at junctions, or from a plurality of sections of rod welded or otherwise secured together.

Attached to the first frame 10 is a vertical member 24 which extends upwardly therefrom. The vertical member 24 is adapted to engage a chain or the like (not shown) to suspend the shackle. The resilient member 14, a helical compression spring is preferred, may be coiled about vertical member 24 and seated on a collar 26.

The second frame 12 includes a cam plate 28 which is supported on the resilient member 14 and is slidably engaged with vertical member 24. The frame 12 is preferably formed from a single substantially rigid rod welded or otherwise secured to cam plate 28. Opposite ends of the rod are attached to opposed edges of the cam plate 28, and the rod is bent downwardly as opposite side members 30 with bottom portions which are inwardly upturned to form an interconnecting arch 34. The inclined sides of the arch 34 and side members 30 form leg retaining slots. As shown in FIGURES 1 and 2, the side members 30 are spaced sufficiently to surround the side portion 18 of the inner frame 10. Thus, in operating this embodiment of the invention, a fowl leg must actually be retained between a side of arch 34 (of outer frame 12) and a shoulder 20 and bottom bar 22 of the inner frame 10.

Frames 10 and 12 are positioned in generally the same plane; and limited vertical movement of frame 12 relative to frame 10 is possible. Horizontal movement of the frames relative to each other is prevented by cam plate 28 engaging the vertical member 24, and by the open loop between shoulders 20 and bottom bar 22 which encompass side members 30 of frame 12. Preferably, when the outer frame 12 is urged to the upper most position, respecting the inner frame 10, the innermost points on side portions 18, at the juncture with shoulders 20, will nearly touch arch 34 so as to prevent movement of a bird's leg therebetween; however, the depending portions of shoulders 20 are sufficiently divergent so as to provide a space from arch 34 through which such legs may extend except for the feet thereof which will not pass therethrough. In such condition a bird may thus be suspended against both upward and downward displacement; and with the major portion of its weight normally exerted against the bottom bar 22 that is directly supported from an overhead conveyor.

Application of a downward external force on cam plate 28, advantageously by a cam element positioned at the desired discharge point of the bird along the path of conveyor travel, will compress the yieldable member 14 causing frame 12 to move downward relative to frame 10. When this occurs the arch 34 is lowered to gradually remove the inside confinement from the slots in which a bird's legs are normally retained. The bottom bar 22 of frame 10 remains stationary, supporting the bird until frame 34 reaches a sufficiently lower position at which time the relatively raised position of bottom bar 22 acts to eject the legs from the slots wherein they were retained.

From the above description the operation of the embodiment of the invention shown in FIGURES 1–3 will be readily apparent. Loading of the shackle is performed while it is suspended on suitable conveying means and while the frame 12 is in a lowered position shown in FIGURE 2 whereupon a bird's legs are placed between each side of arch 34 and the shoulders 20. After insertion of the fowl into the shackle, the frame 12 is raised, by spring 14, to the position shown in FIGURE 1 whereupon each leg will be completely confined against accidental release of the bird during processing operations such as scalding. Compression of resilient member 14 is effected to discharge the bird from the shackle, the shackle frames resuming the position shown in FIGURE 2 permitting ejection of the legs from the widened space between arch 34 and shoulders 20.

From the foregoing it can be seen that resilient member 14 is compressed, preferably by a camming element (not shown) acting on cam plate 28 for loading and unloading of the shackle.

Referring to FIGURES 4 through 6, there is illustrated another embodiment having a first frame 40, and a second frame 42 confined to vertical movement relative to frame 40. This embodiment enables easy insertion of a bird into the shackle either with or without depression of second frame 42 relative to first frame 40.

The first frame generally 40 includes a vertical shaft 44 bent to form a chain engaging hook 46 and having a seating collar 48 fixed to the shaft about one-third upwardly from its lower extrimity. Attached to a bottom portion of vertical shaft 44 is a horizontal loop 50 through which a portion of the second frame 42 is disposed.

A pair of biased arms 52 are attached to opposite sides of the seating collar 48 extending downwardly and outwardly therefrom in a plane parallel to the second frame 42. Arms 52 are preferably manufactured from spring steel wire, or the like, so that they may be urged downwardly and inwardly toward the bottom portion of shaft 44.

Seated in collar 48 is a resilient means comprising a compression spring 54 coiled about vertical member 44. The spring 54 is vertically deformable under compressive force applied to the top thereof.

The second frame 42 includes a cam plate 56 which is supported on the top of spring 54 and slidably engages the vertical shaft 44. Attached to opposed ends of cam plate 56 are a pair of downwardly extending side portions 58 which are bent downwardly and inwardly and then upwardly and inwardly to form an arch 66. Side portion 58 and the arch 66 are spaced sufficiently to define a pair of leg retaining slots in which the legs of a bird may be held. The arch 66 is positioned within the loop 50 of frame 42. The ends of the loop 50 extend nearly to the side portions 58 and provide means to eject the legs of a bird from the aforementioned retaining slots.

Frames 40 and 42 are aligned in the same or adjacent parallel planes for vertical movement of frame 42 relative to frame 40. Preferably frame 42 is substantially a planar element and the bottom section of shaft 44, below collar 48, is offset (as shown in FIGURE 5) so as to properly align loop 50 with arch 66.

The biased arms 52 are positioned so that they extend in a horizontal direction, either horizontally or obliquely to the horizontal, substantially across the top portion of arch 66 to points closely adjacent sides 58 so as to effectively block upward removal of a leg from either of the retaining slots defined by the aforementioned arch 66 and side portions 58. However, the legs of a bird may readily be inserted in those slots simply be pressing them downwardly against the biased arms 52 which will depress until the legs are within the slots and then return to the extended position illustrated. When the legs of a bird are thus positioned in the retaining slots the weight of the bird will be exerted against the ends of loop 50 of frame 40.

An external force downwardly applied on cam plate 56 (by a cam element positioned at the desired discharge point along a supporting conveyor) compresses resilient member 54 causing frame 42 to move downward relative to frame 40. This movement will vertically separate the arms 52 and arch 66 sufficiently to provide space to permit passage of the feet of a bird. Since the legs rest essentially on the ends of loop 50, which remains stationary, lowering of the arch 66 will cause the loop 50 to effectively eject a bird's legs from the shackle.

Although we have described two embodiments of our invention, it is apparent that modifications thereof may be made by those skilled in the art and therefore only such limitations should be imposed as are indicated in the appended claims.

We claim:

1. An improved automatic poultry shackle comprising: a first wire frame having an upwardly extending member for suspending the shackle from an overhead conveyor; a second wire frame formed in the shape of an enclosed figure having substantially vertical sides, said second frame generally encompassing said first frame and being reciprocable vertically with respect thereto; a compression spring attached between said first and second frame to normally urge said second frame upwardly with respect to said first frame; an upwardly curved arch member formed in the bottom of said second frame, said arch member cooperating with said first frame and the side of said second frame to define a pair of upwardly opening slots for receiving the legs of a fowl and retaining said legs against downward and sidewise displacement, said slots being of a width preventing the passage of the feet of said fowl therethrough; a horizontal bottom member at the bottom of said first frame, said horizontal member extending across at least a substantial portion of said slots so as to support the weight of a fowl exerted thereon by the legs thereof; and a substantially horizontally projecting blocking member fixedly mounted on said first frame extending across at least a portion of said slots above said bottom member, said blocking member extending substantially across the space between said vertical sides and arch of said second frame when the latter is in an upper position and extending above said arch when said second frame is moved against said spring to a lower position whereby legs will be ejected from the upwardly open portions of said slots by said bottom member.

2. A device in accordance with claim 1 wherein the first frame is in the shape of an enclosed bent wire figure having opposite side members, and the blocking member is a pair of inwardly extending shoulders formed by bends in the side members of said first frame.

3. A device in accordance with claim 1 wherein the first frame is in the shape of a vertical shaft having a horizontal bottom member, and the blocking member is a pair of biased arms attached to said shaft above said bottom member and extending substantially to the sides of said second frame.

4. The device of claim 3 wherein said biased arms are formed of wire spring displaceable downwardly to permit insertion of a fowl's legs into said slots.

References Cited by the Examiner

UNITED STATES PATENTS

| | | | |
|---|---|---|---|
| 1,742,569 | 1/1930 | Barker et al. | 17—44.1 |
| 2,035,948 | 3/1936 | De Vout | 17—44.1 |
| 2,632,201 | 3/1953 | Van Dolah | 17—44.1 |
| 3,044,109 | 7/1962 | Wayne | 17—44.1 |
| 3,113,341 | 12/1963 | Lewis | 17—44.1 |
| 3,132,373 | 5/1964 | Altenpohl | 17—44.1 |
| 3,134,135 | 5/1964 | Harben | 17—44.1 |
| 3,156,947 | 11/1964 | Birchmier et al. | 17—44.1 |

SAMUEL KOREN, *Primary Examiner.*

H. P. DEELEY, JR., *Assistant Examiner.*